United States Patent
Carletta et al.

(10) Patent No.: US 9,830,691 B2
(45) Date of Patent: Nov. 28, 2017

(54) METHOD FOR REAL-TIME IMPLEMENTABLE LOCAL TONE MAPPING FOR HIGH DYNAMIC RANGE IMAGES

(75) Inventors: Joan Elizabeth Carletta, Broadview Heights, OH (US); Firas Hussein Hassan, Akron, OH (US)

(73) Assignee: The University of Akron, Akron, OH (US)

( * ) Notice: Subject to any disclaimer, the term of this patent is extended or adjusted under 35 U.S.C. 154(b) by 1140 days.

(21) Appl. No.: 12/221,505

(22) Filed: Aug. 4, 2008

(65) Prior Publication Data

US 2009/0041376 A1   Feb. 12, 2009

Related U.S. Application Data

(60) Provisional application No. 60/953,782, filed on Aug. 3, 2007.

(51) Int. Cl.
*G06K 9/40* (2006.01)
*G06T 5/00* (2006.01)
*G06T 5/50* (2006.01)

(52) U.S. Cl.
CPC ............... *G06T 5/009* (2013.01); *G06T 5/50* (2013.01); *G06T 2207/20208* (2013.01)

(58) Field of Classification Search
USPC .................................................. 382/167, 274
See application file for complete search history.

(56) References Cited

U.S. PATENT DOCUMENTS 6,501,504 B1   12/2002  Tatko et al.
2006/0034489 A1*  2/2006  McClanahan ................. 382/107

OTHER PUBLICATIONS

Debevec et al, High Dynamic Range Imaging, SIGGRAPH 2004.*
Adelson et al, Pyramid methods in image processing, RCA Engineer 1984.*
Ben Cope et al, Have GPUs made FPGAs redundant in the field of Video Processing?, IEEE 2005.*
"Interactive Time-Dependent Tone Mapping using Programmable Graphics Hardware," ACM International Conference Proceeding Series: 14th Eurographics Workshop on Rendering, vol. 44, pp. 26 through 37, 2003.
"Perceptual Effects in Real-Time Tone Mapping," Proceedings of the 21st Spring Conference on Coputer Graphics, pp. 195-202, 2005.

* cited by examiner

*Primary Examiner* — Mark Roz
(74) *Attorney, Agent, or Firm* — Renner Kenner Greive Bobak Taylor & Weber

(57) ABSTRACT

The present invention relates to a method capable of real-time implementable local tone mapping of high dynamic range images. In one embodiment, the present invention relates to a method capable of accomplishing real-time local tone mapping of high dynamic range images so that they have clear details without, for example, halo artifacts when viewed on standard display devices. In another embodiment, the present invention relates to a method capable of accomplishing real-time local tone mapping of high dynamic range images so that they have clear details without, for example, halo artifacts when viewed on standard display devices where such a method utilizes, in part, a modified Reinhard operator.

8 Claims, 11 Drawing Sheets

Rosette groveC groveD

Vinesunset

Memorial

Nave

Nave

Rosette groveC groveD

Memorial

Vinesunset

12 # METHOD FOR REAL-TIME IMPLEMENTABLE LOCAL TONE MAPPING FOR HIGH DYNAMIC RANGE IMAGES

RELATED APPLICATION DATA

This application claims priority to previously filed U.S. Provisional Patent Application No. 60/953,782, filed on Aug. 3, 2007, entitled "Real-Time FPGA-Based Architecture For a Reinhard-Like Tone Mapping Operator," which is hereby incorporated herein by reference in its entirety.

FIELD OF THE INVENTION

The present invention relates to a method capable of real-time implementable local tone mapping of high dynamic range images. In one embodiment, the present invention relates to a method capable of accomplishing real-time local tone mapping of high dynamic range images so that they have clear details without, for example, halo artifacts when viewed on standard display devices. In another embodiment, the present invention relates to a method capable of accomplishing real-time local tone mapping of high dynamic range images so that they have clear details without, for example, halo artifacts when viewed on standard display devices where such a method utilizes, in part, a modified Reinhard operator.

BACKGROUND OF THE INVENTION

Novel camera sensors can capture scenes of much wider dynamic range than a standard display device can display. The result of this mismatch is that printed and displayed images are commonly lacking in clear detail. The problem is even more pronounced for synthetic images produced by fusing multiple views of a scene. Tone mapping operators are used to bridge this mismatch. They compress the dynamic range of a high dynamic range scene to the displayable range while reproducing as much as possible of the visual sensation of the scene.

Tone mapping operators can be classified according to whether their operators are spatially uniform or non-uniform. Spatially uniform operators, so called global operators, are independent of the local spatial context. They apply the same transformation function on each pixel of the image. Spatially non-uniform operators, so called local operators, use a transformation function that varies adaptively with the local characteristics of the image. In general, spatially non-uniform operators produce higher quality tone mapped images than spatially uniform operators, but they have some drawbacks. Visually, the main disadvantage of spatially non-uniform operators is the appearance of "halo" artifacts; these are dark or white bands that appear at the borders between regions of different brightness in the image. Spatially non-uniform operators require complex computations, and implementing them in real-time on an embedded system is a challenging task.

Accordingly, there is a need in the art for a method capable of real-time implementable local tone mapping of high dynamic range images.

SUMMARY OF THE INVENTION

The present invention relates to a method capable of real-time implementable local tone mapping of high dynamic range images. In one embodiment, the present invention relates to a method capable of accomplishing real-time local tone mapping of high dynamic range images so that they have clear details without, for example, halo artifacts when viewed on standard display devices. In another embodiment, the present invention relates to a method capable of accomplishing real-time local tone mapping of high dynamic range images so that they have clear details without, for example, halo artifacts when viewed on standard display devices where such a method utilizes, in part, a modified Reinhard operator.

In one embodiment, the present invention relates to a method for achieving the local tone mapping of high dynamic range images comprising the steps of: (A) providing at least one HDR RGB triplet suitable for local tone mapping; (B) calculating at least one luminance component of the at least one HDR RGB triplet using a luminance computation sub-block; (C) supplying the one or more luminance components to at least one approximated Gaussian pyramid sub-block and at least one log average sub-block, wherein the luminance components supplied to the at least one approximated Gaussian pyramid sub-block and at least one log average sub-block are used to, respectively, generate at least one local illumination estimate and at least one global illumination estimate; (D) buffering the HDR RGB triplet in at least one buffer sub-block; and (E) supplying the at least one local illumination estimate, the at least one global illumination estimate, the at least one luminance component and the buffered RGB triplet to a color tone mapping sub-block to generate a mapped RGB triplet.

In another embodiment, the present invention relates to a method for achieving the local tone mapping of high dynamic range images comprising the steps of: (a) providing at least one input pixel stream suitable for local tone mapping; (b) calculating at least one local luminance estimate of the at least one input pixel stream using a approximated Gaussian pyramid sub-block; (c) calculating at least one global illumination estimate of the at least one input pixel stream using a log average sub-block, and (d) normalizing the at least one input pixel stream by subjecting it to a weighted sum of the at least one local illumination estimate and the at least one global illumination estimate in order to generate a mapped output pixel stream.

DETAILED DESCRIPTION OF THE INVENTION

The present invention relates to a method capable of real-time implementable local tone mapping of high dynamic range images. In one embodiment, the present invention relates to a method capable of accomplishing real-time local tone mapping of high dynamic range images so that they have clear details without, for example, halo artifacts when viewed on standard display devices. In another embodiment, the present invention relates to a method capable of accomplishing real-time local tone mapping of high dynamic range images so that they have clear details without, for example, halo artifacts when viewed on standard display devices where such a method utilizes, in part, a modified Reinhard operator.

In one embodiment, the present invention is directed to a method for local tone mapping of high dynamic range images that, in part, utilizes an unique algorithm so that such images have clear details without halo artifacts when viewed on standard display devices. In one instance, the method of the present invention can be conducted in real-time an embedded system thereby achieving high throughput at a low cost. In one embodiment, the algorithm utilized in the method of the present invention is a modification of the Reinhard operator. In one embodiment, the present invention utilizes approximations to an original Reinhard operator to ensure that the operator is amenable to implementation in the hardware utilized to carryout the method of the present invention.

The method of the present invention will now be explained with reference to a number of examples. It should be noted that the present invention is not limited to solely the examples disclosed herein, but rather, as will be apparent to those of skill in the art, should be broadly construed in light of the method outlined herein.

Figure 1:
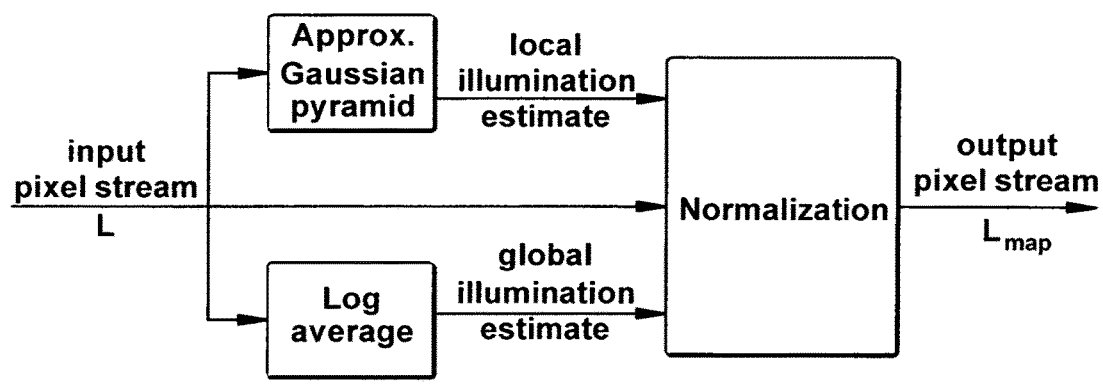
FIG. 1 is a block illustration of one method of the present invention.

One example of the method of the present invention is detailed in the block diagram of FIG. 1. In this example an input pixel stream from a video frame is supplied to suitable electronic device (e.g., a computer) running suitable software. A Gaussian pyramid is then used to estimate the illumination local to the pixel. A logarithmic average is also computed for the global image to provide an estimate of the global illumination. Finally, the input pixel is normalized by a weighted sum of the local and global illumination estimates.

In one embodiment of the present invention hardware was developed for each sub-block that approximates the original operator well, but is simple enough for real-time embedded processing. The next consideration is hardware-friendly approximations to the Gaussian pyramid, log average and normalization blocks.

Approximate Gaussian Pyramid:

The approximate Gaussian pyramid uses a number of different two-dimensional windows to calculate a number of different averages around a pixel, and selects the most suitable one as an estimate of the pixel's local illumination. The number of windows is basically dependent on the dynamic range of the input images. For the remaining discussion the present invention will use the nine scale approximate Gaussian pyramid as an example for hardware approximation and implementation.

Figure 2:
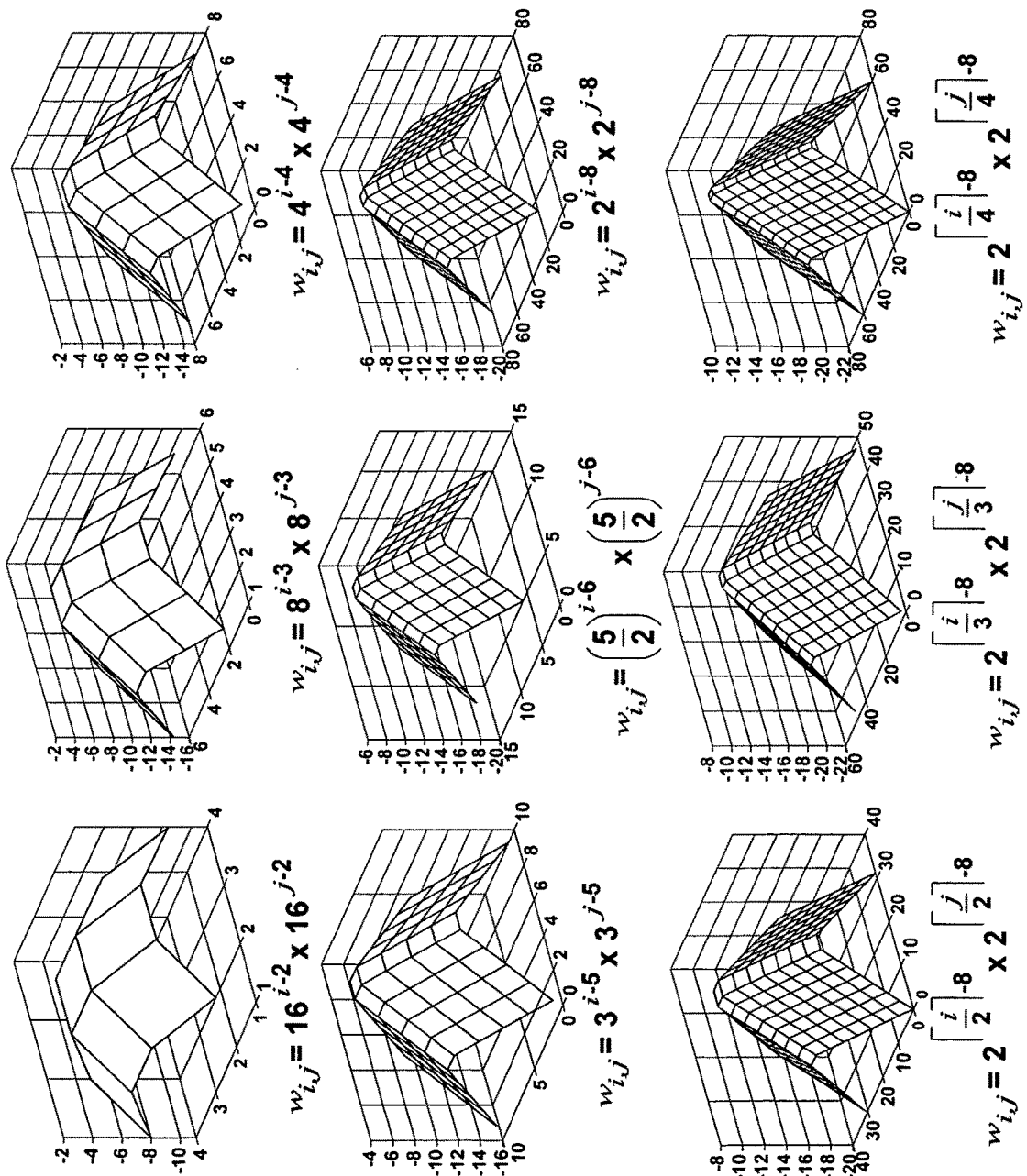
FIG. 2 is an illustration of the windows of a nine scale approximate Gaussian pyramid.

When calculating the local averages around the pixel, the original Reinhard operator weights the pixels in a surround according to the following Gaussian function:

$$g(i, j, s) = \frac{1}{\pi s^2} e^{-\frac{i^2+j^2}{s^2}}$$

where i and j are the indices indicating the distance from the pixel, and s is the scale of the surround; this scale controls the rate of decay of the Gaussian surround around the pixel being processed. The required coefficients, with their exponential relationship, are in general difficult to implement in fixed-point mathematics. According, the present invention replaces these coefficients with ones that serve the same purpose but are much more hardware-friendly. FIG. 2 is an illustration of the windows of a nine scale approximate Gaussian pyramid. The intensity shown in the figure is proportional to the logarithmic of the corresponding weight in the window. Expressions for the pixel weights in the upper left quadrant are given in FIG. 2, where ⌈ ⌉ denotes the ceiling function; the other three quadrants can be obtained via symmetry.

As in a Gaussian surround, larger weights are given to the pixels in the center of the window; however, the present invention approximates the steep exponential drop-offs of the six smaller windows by implementing filters with coefficients that are with powers of sixteen, eight, four, three, five over two, and two, respectively; the less steep drop-offs of the three largest windows are approximated by using filter coefficients that are powers-of-two repeated two, three, and four times, respectively. In one embodiment, this special relationship of the weights enables that computation of the averages can be done with simple hardware.

In this embodiment, the two-dimensional square windows are implemented using two one-dimensional filters. The vertical filter calculates the average of the input image along the columns. The horizontal filter calculates the average of the image processed by the vertical filter along the rows.

Vertical Filters:

All vertical filters are implemented using simple accumulator structures. One accumulator is devoted to the falling geometric series. A second accumulator tracks the rising geometric series. Taking the vertical filter for the fifth scale as an example, when the window slides one pixel further along the data, the accumulators are updated in the following manner:

$$acc1[n] = \frac{2}{5} acc1[n-1] + \left(\frac{5}{2}\right)^2 M[n] - \frac{2}{5} T[n]$$

$$acc2[n] = \frac{5}{2} acc2[n-1] + B[n] - \left(\frac{5}{2}\right)^6 M[n]$$

$$ave[n] = \frac{1 - \frac{5}{2}}{1 - \left(\frac{5}{2}\right)^6} \times \frac{a_1[n] + a_2[n]}{2}$$

where B is the pixel entering the window at the bottom, M is the pixel in the middle of the window, and T is the pixel leaving the window at the top. While the accumulator updates described in Equations apply only to windows that lie completely within the borders of the image, the updates can be easily modified using stacks to accomplish symmetric extension at the image borders while still inputting each image pixel only once. Similar structure is used to implement the vertical filters for the other eight scales. The basic difference is in the scale of the geometric series, the number of accumulators, and the bits allocated for each accumulator.

Figure 3A:
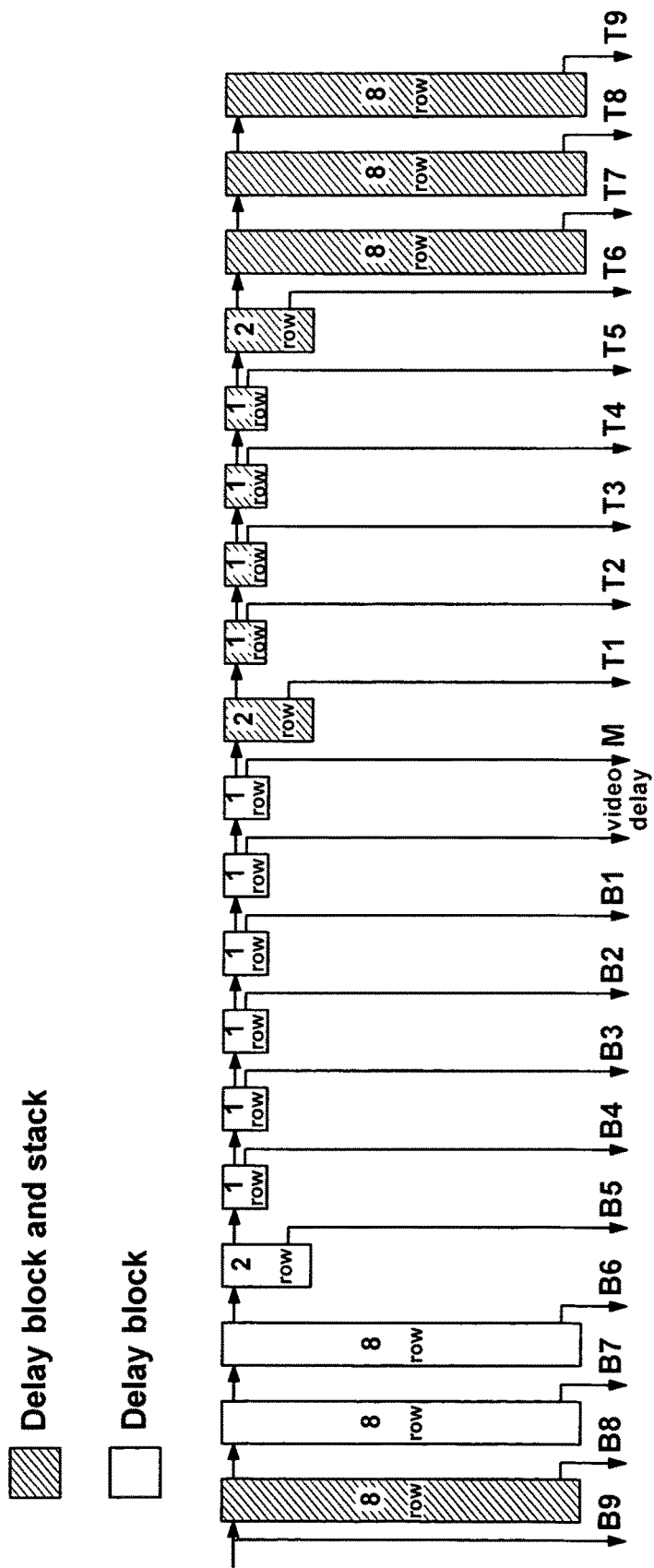
FIG. 3A is an illustration of one embodiment of a memory organization for the nine-scale approximate Gaussian pyramid as used in the method of the present invention.
Figure 3B:
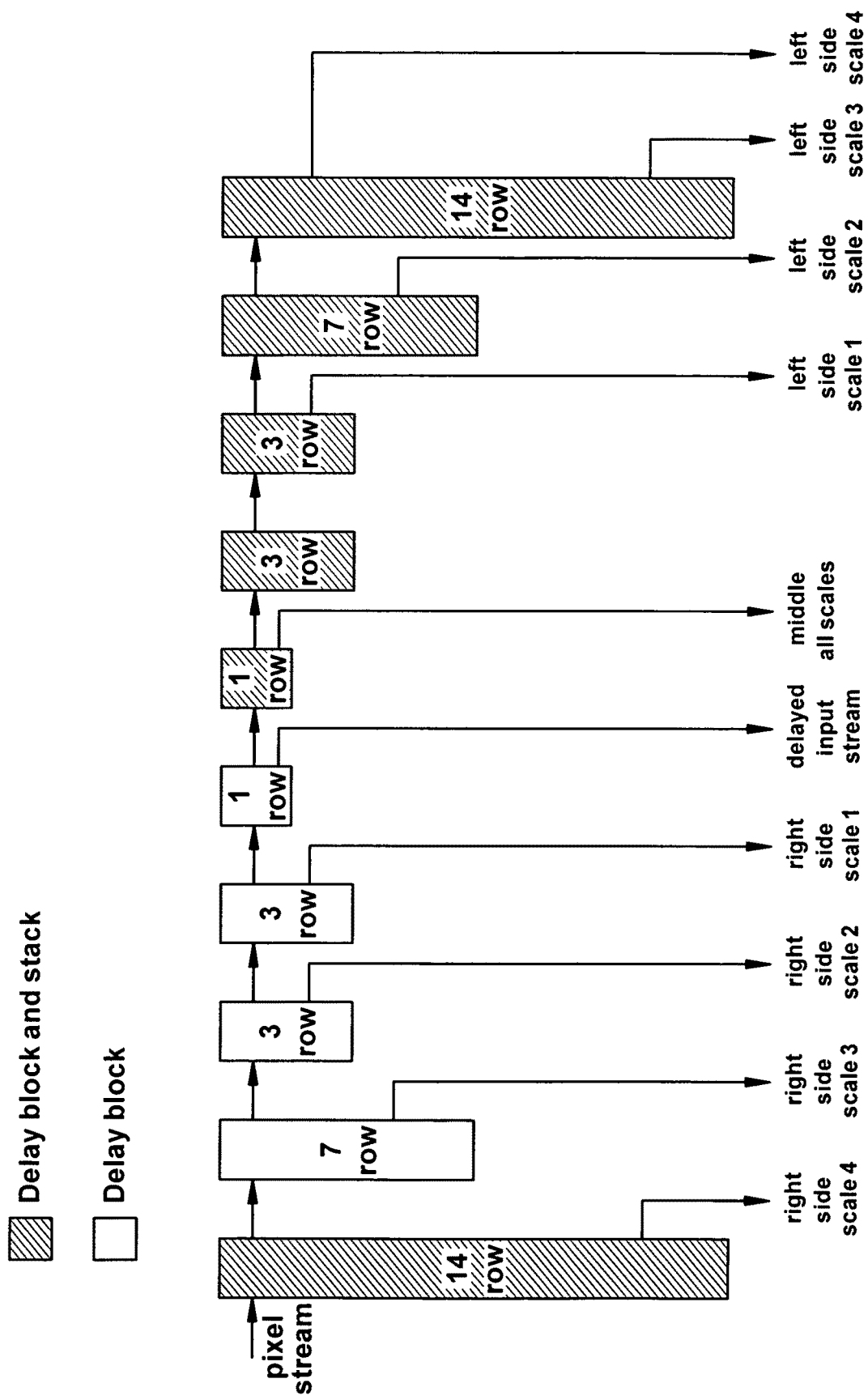
FIG. 3B is an illustration of another embodiment of memory organization for use with the present invention.

A memory organization is necessary for supplying data for the nine differently-sized windows. Memory is also needed to supply a delayed input pixel stream, synchronized such that each input pixel appears simultaneously with its different averages. As shown in FIG. 3A, in one embodiment the present invention divides the sixty-four rows of pixels needed for the update of the largest window into nineteen separate memories, each implemented using dual-port physical memories. The memory organization ensures that all pixels needed in a single time step are in different physical memories; these pixels include the nine pixels at the bottoms of the nine windows, the nine pixels at the tops, the one pixel that lies in the (common) middle of the nine windows, and the delayed version of the input pixel stream. Because they are in different physical memories, all pixels needed to update the accumulators in a given time step can be read simultaneously.

Horizontal Filters:

Although the accumulator structures described above are the simplest method to implement geometric series functions, they are not sufficient to implement all horizontal filters. For the vertical filters, the accumulators are updated row by row; hence, the present invention has a number of clocks between updates in which computations can be done. For the horizontal filters the accumulators should be, in one instance, updated pixel by pixel, and therefore all computations should, in one embodiment, be done in a single clock cycle. For scales involving more complex update computations, the accumulator structure is not a good choice because the critical path of the algorithm will necessarily be high, so that the maximum operating frequency and throughput are low. Instead, in this instance, the present invention uses a direct form FIR filter to implement the first three scales of 16, 8 and 4 respectively. Also, the present invention uses a direct form FIR filter to implement the next two scales of 3 and 2.5 respectively. Finally, the present invention uses the accumulator structure to implement the remaining scales.

Average Selection Criterion:

After using the different windows to calculate the weighted averages around a given pixel, the present invention selects one of the averages as the most suitable local illumination estimate for the pixel. The difficulty is in determining how large a window to use in calculating the local average; if too small a window is used, it does not give an accurate estimate of the local illumination, but if too large a window is used, the window may encompass a change in brightness that will throw off the estimate. Halo effects are caused when too large a window encompasses a sudden change in brightness levels, causing a pixel to be normalized incorrectly. Reinhard's solution is to consider successively larger windows. A smaller window is eliminated from consideration if the relative difference between its average and the average of the next larger window is no more than a set threshold; then, the larger window is judged to include no additional sudden changes in brightness level, so that it is considered to be a better estimate of local illumination.

The pseudocode of the algorithm is given in Table 1, where avei represents the weighted average for the $i^{th}$ scale, and ave represents the chosen local illumination estimate.

The most computationally complex part of the algorithm is the division required for the relative difference. In one embodiment, the present invention dies this division in a hardware-friendly way by converting the fixed-point value for the denominator into a floating-point value with a mantissa between 0.5 and 1. The present invention then uses an iteration based on the Newton-Raphson method to find the reciprocal, after retrieving an initial guess for the iteration from a look-up table that is indexed on a limited number of bits of the mantissa. The procedure is such that one look-up and one iteration are enough to achieve the required precision.

TABLE 1

Pseudocode to Determine Which Scale Gives the Best Estimate of Local Illumination

| | |
|---|---|
| $ratio1 = \frac{\|ave1 - ave2\|}{ave1}$ | if ratio1 >= ε then |
| | ave = ave1 |
| $ratio2 = \frac{\|ave2 - ave3\|}{ave2}$ | else if ratio2 >= ε then |
| | ave = ave2 |
| ⋮ | ⋮ |
| $ratio7 = \frac{\|ave7 - ave8\|}{ave9}$ | else |
| $ratio8 = \frac{\|ave8 - ave9\|}{ave8}$ | ave = ave9 |
| | end |

Log Average:

The log average sub-block calculates an estimate of the global illumination of the image. It does this by computing the sum of the base-2 logarithms of all the pixels in the image. The global illumination is estimated as 2 raised to this sum, and corresponds to the average of all the pixels. In the present invention, it should be noted that to properly compute the log average luminance one requires access to the entire image; in a video application, this would result in unacceptable latency, since one could not begin processing a frame until one receives the from in its entirety. Accordingly, to achieve real-time performance, the log average luminance of the previous frame can, in one embodiment, be used to normalize the pixels of the current video frame. This choice is justifiable for two reasons. First, the global log average luminance does not change dramatically between two consecutive video frames, especially for videos with high frame rates. Second, the human vision system takes some time to adapt to the global brightness of the scene.

Figure 4:
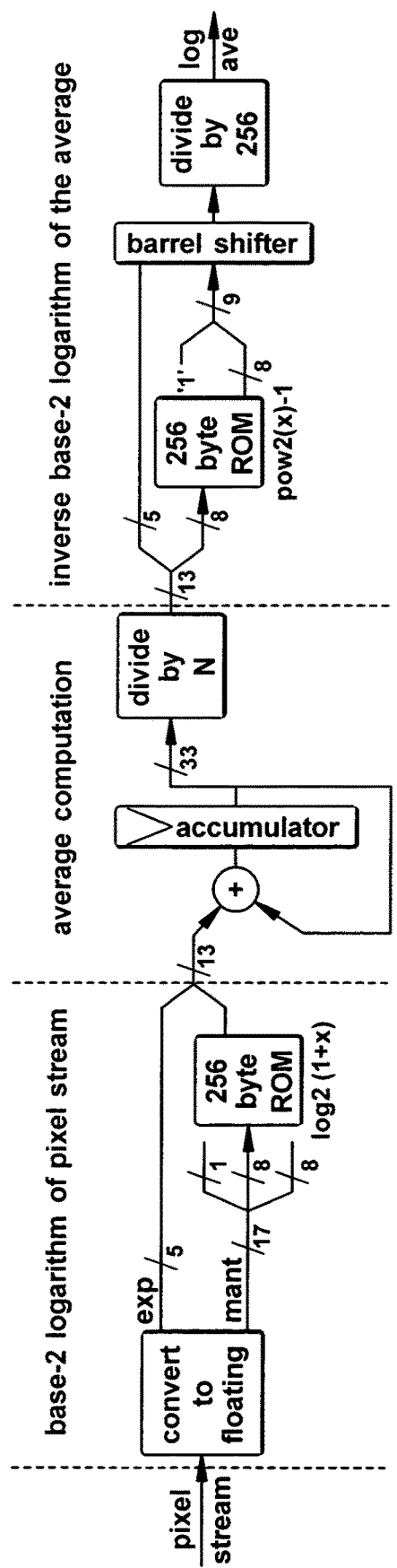
FIG. 4 is an illustration of a block diagram of the log average luminance sub-block used by one embodiment of the present invention to estimate the global illumination for a pixel.

FIG. 4 illustrates a block diagram of the log average luminance sub-block. FIG. 4 is divided into three main sub-blocks. The first takes the base-2 logarithm of the pixel stream, the second computes the average of the logarithms, and the third takes the inverse base-2 logarithm of the average.

An estimate of the base-2 logarithm of an integer x can be found from the number of leading zeros in the integer; the weight of the most significant '1' in x is the integer part of the base-2 logarithm, and the remaining bits in x determine the fraction part of the logarithm. For example, the integer 3481 has its most significant '1' in the eleventh position; its logarithm can be written as:

$$\log_2(3481) = \log_2(2^{11} + 1433) = 11 + \log_2\left(1 + \frac{1433}{2^{11}}\right).$$

The present invention utilizes the bits following the most significant one bit in a number of different ways to estimate the fraction part of the base-2 logarithm; the present invention needs to compute $\log_2(1+f)$, where f is a number between 0 and 1. In one embodiment, the present invention proposes to use a fixed number of bits following the most significant '1' to look up the value of $\log_2(1+f)$ in a table. The size of the lookup table and the error in the estimation depend on how many bits are used to address that table, and how many fraction bits are stored in the table. As an example, for an address size of eight and word size of eight, $\log_2(1+1433/2^{11})=0.761$, so that the present invention's estimate of $\log_2(3481)$ is 11.761. The actual value is 11.765. Thus, the method of the present invention yields a quantifiable trade-off between hardware cost and the percentage error at the output of the log average luminance sub-block.

The sum of the base-2 logarithms of all the pixels in the image is computed using an accumulator. The width of the accumulator depends on the resolution and dynamic range of the image. For example, a 1024×768 image with 13 bits of precision for the base-2 logarithm (five bits for the integer part and eight bits for the fraction part) requires an accumulator of 33 bits. The log average is found by dividing the accumulator by the number of pixels in the image.

The final step of the log average luminance is to compute the inverse base-2 logarithm of the average. Writing the average as an integer part x and a fraction part f, yields the following equation:

$$2^{x+f} = 2^x \times 2^f$$

where $2^x$ is a power-of-two and $2^f$ is a number between 1 and 2, which the present invention further breaks into 1+g. A look-up table, addressed with eight bits of f and holding a word size of eight bits, is used to determine g, and the '1' is added. The result is then multiplied by $2^x$ using a barrel shifter. The final output of the log average luminance is computed by truncating the fraction bits of the output of the barrel shifter. This log average luminance is the global estimate of illumination $L_{ave\_global}$ for the pixel.

Normalization Block:

The normalization block takes the local average around the pixel and the weighted log average as inputs to normalize the pixel stream. The present invention adds these two quantities to obtain the normalization value for a pixel. The output of the algorithm is given by the following equation:

$$L_{map} = \frac{L}{L_{ave\_local} + a * L_{ave\_global}}$$

where a is a weighting factor, $L_{ave\_local}$ is the local estimate of illumination around the pixel, $L_{ave\_global}$ is the global illumination estimate and $L_{map}$ is the mapped luminance represented in floating point. The division method previously described is used again here.

At this point, the output pixel stream is represented in floating-point with eight bits of mantissa and five bits of exponent. The final step of the method of the present invention is to convert the output pixel stream to fixed-point. For display purposes, the normalized pixel stream should have an eight-bit gray level between 0 and 255. In one embodiment, the present invention scales $L_{map}$ to this range by first adding eight to the output pixel exponent, which is equivalent to multiplying the output pixel stream by 256. Then, the method of the present invention sends the mantissa of the output pixel stream to a barrel shifter controlled by the exponent to convert the pixel to fixed-point, and saturates the fixed-point output to 255.

Embedded Implementation:

Various platforms can be considered for embedded systems computing, from general purpose digital signal processors, to field programmable gate arrays (FPGAs), to application specific integrated circuits. Of these platforms, the present invention selected, in one instance, FPGAs to implement the method disclosed herein. The method of the present invention is described in VHDL, and synthesized for a StratixlI FPGA device using Altera's Quartus II v5.0 toolset; functionality of the method and its algorithm is verified by simulating the processing of test images using Modelsim. The architecture is sized in order to accommodate high resolution images of high dynamic range with 1024×768 pixels and 28 bits per pixel. It should be noted that memory requirements would be less for lower resolution images or images of smaller dynamic range.

Synthesis Results:

Table 2 summarizes the synthesis report from Quartus. The simplicity of hardware is reflected in the clock speed achieved, and in the low utilization of logic cells. The implementation uses a significant percentage of the available embedded memory. It is clear that processing algorithms for high resolution images, in general, require significant amounts of memory. If they are to be implemented on a single chip, they need a specialized FPGA device with extended memory capabilities.

TABLE 2

| Summary of Hardware Synthesis Report | |
| --- | --- |
| Device | EP2S130F780C4 |
| Total bits of memory | 3,153,408/6,747,840 (46%) |
| Total logic cells | 34,806/106,032 (32%) |
| Max operating frequency | 77.15 MHz |
| Latency between rows | 3 (controller) + 32 (filter_size/2) + 29 (hardware) |
| Latency between frames | 32 rows (filter_size/2) |

The architecture of the present invention needs, in one embodiment, a horizontal blanking period of 64 pixels, and a vertical blanking period of 32 rows. The horizontal blanking period is divided into three parts. Three clocks at the beginning of every row are necessary to check the start of the row and prepare the algorithm to process the row according to its position in the frame. Thirty-two clocks at the end of every row are necessary for the latency of the largest horizontal filter. Twenty-nine extra clocks at the end of every row are necessary for the hardware latency. The vertical blanking period is necessary for the latency of the largest vertical filter. Given that the present invention strives to achieve a video frame rate of 60 frames per second, and that there are (1024+64)*(768+32) or 870,400 pixels in the frame when the present invention includes the blanking periods, the present invention needs to be able to process 60*870,400=52.24 megapixels per second. The present invention's architecture, which has a maximum operating frequency of 77.15 MHz, can accommodate this by taking in one pixel per clock.

Figure 5:
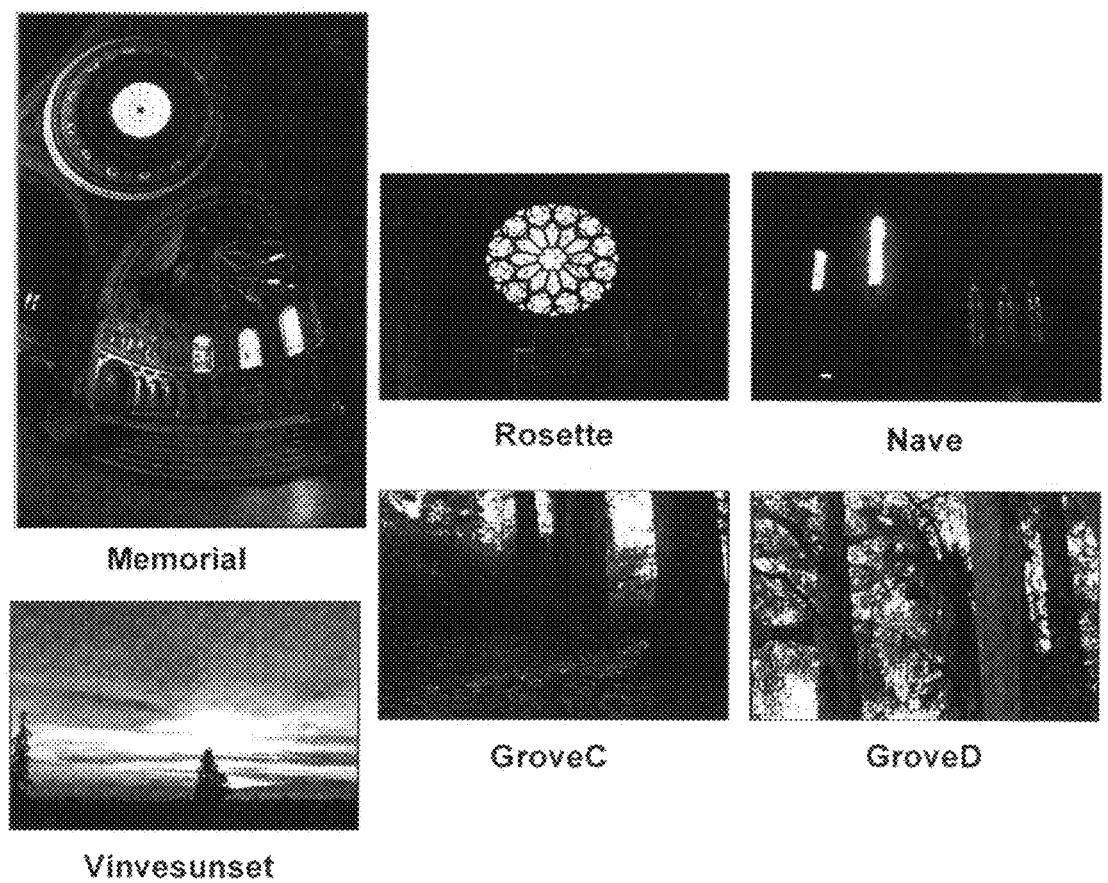
FIG. 5 is a set of image used for a simulation in connection with the method of the present invention as disclosed in FIG. 1.

Simulation Results:

To test the visual quality of the algorithm we used a set of testbench high dynamic range images. The set of images is shown in FIG. 5, where the luminance values are linearly mapped to the normal dynamic range. The only two parameters of the algorithm are the weight of the global average a in the normalization block and the threshold $\epsilon$ of the selection criterion. In one embodiment, the present invention utilizes fixed values a=2 and $\epsilon$=0.0625.

Figure 6:
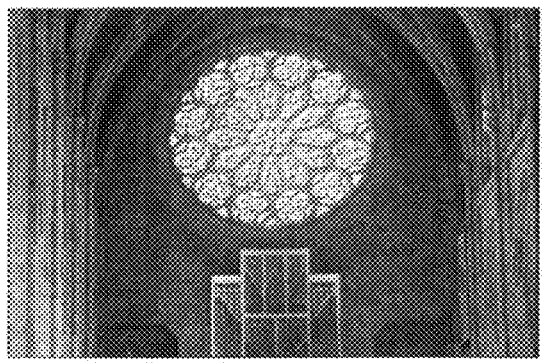
FIG. 6 is the set of images of FIG. 5 after being subjected to a method in accordance with one embodiment of the present invention.
Figure 6:
Figure 6:
Figure 6:
Figure 6:
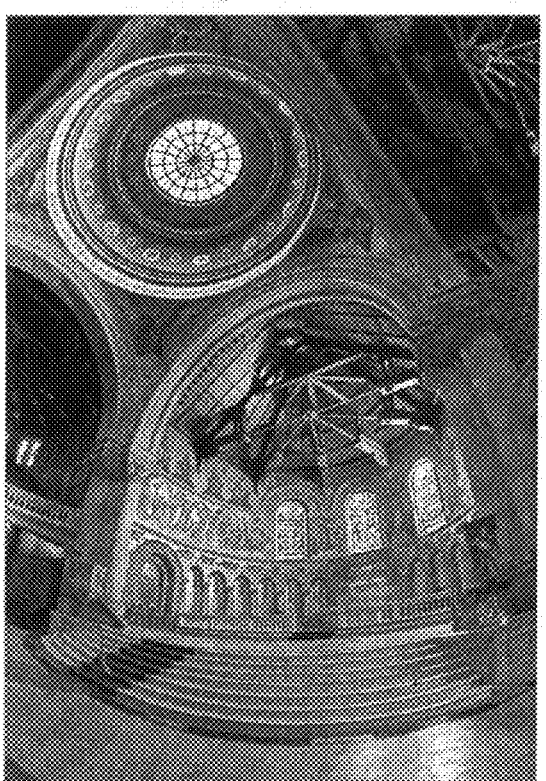
Figure 6:
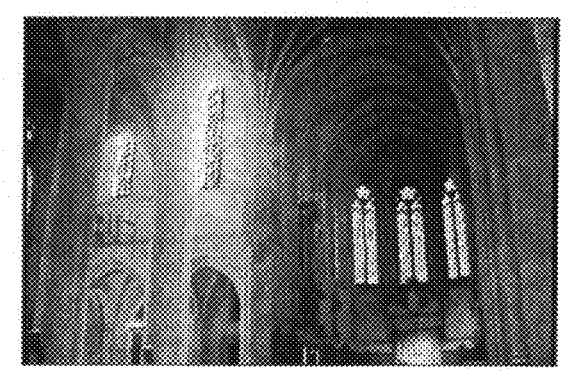

FIG. 6 shows the set of images after processing by one method in accordance with the present invention. Evaluating the output images visually, ones does not observe halo artifacts; for this set of images, these would manifest themselves as black or bright bands around the church windows and behind the trees in the natural images. Details in the dark areas can be seen, and edges look sharp.

Additionally, using the method described herein a study of the error introduced by the present invention's hardware approximations to the Reinhard operator. The gold standard is a floating-point version of the Reinhard operator that uses a nine-level true Gaussian pyramid; the nine levels have scales of 1, 1.5, 2, 2.5, 3, 4, 8, 12 and 16, respectively. Theses scales are chosen because they correspond to the values chosen for the present invention's hardware approximation. Considering the processed image from the gold standard to be the signal, and the difference between the processed images from the gold standard and the proposed hardware architecture to be the noise, the peak signal-to-noise ratio (PSNR) is calculated for each test image. The results are shown in Table 3. The size of the PSNR values confirms that the present invention's fixed-point approximations match the floating-point well, and thus confirms that the approximation is reasonable.

TABLE 3

PSNR Results for the Test Images

| Memorial | Rosette | Nave | GroveC | GroveD |
|---|---|---|---|---|
| 33.7 dB | 34.0 dB | 35.6 dB | 35.9 dB | 35.5 dB |

Extension to Color:

The method of the present invention can also be extended to the color domain. The basic idea is to calculate the luminance component from the HDR RGB triplet. The global and local illumination estimates around every pixel are calculated from the luminance component. These estimates are used to get the mapped RGB triplet.

Figure 7:
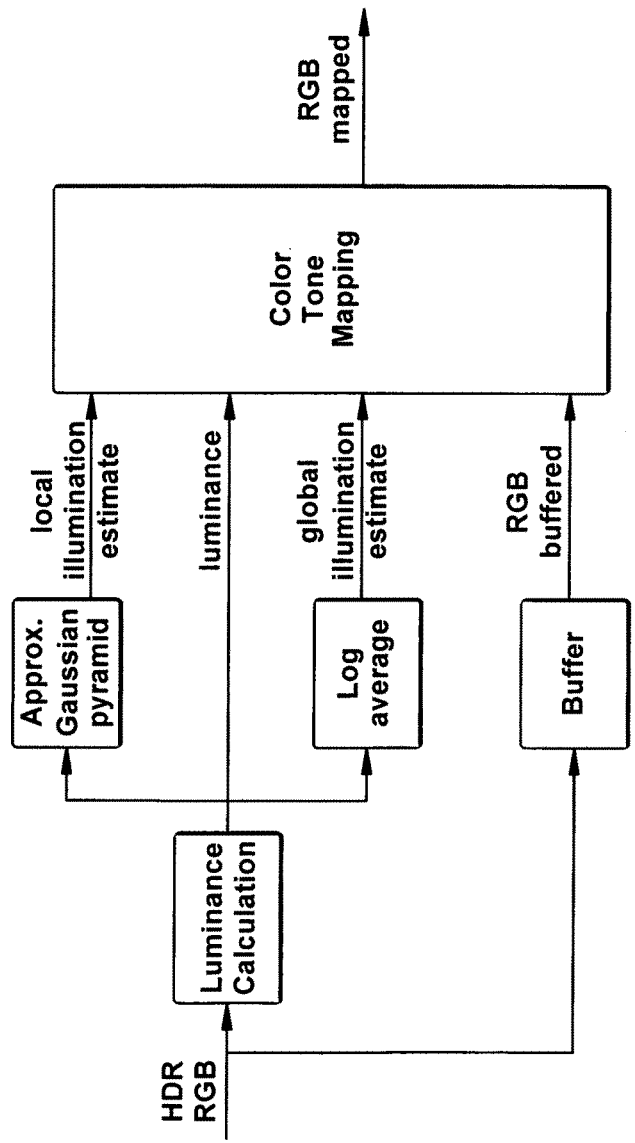
FIG. 7 is a block illustration of another method of the present invention.

The block diagram of the extended version of the algorithm is shown in FIG. 7 and is made up of five sub-blocks. Starting with the HDR RGB triplet the present invention calculates the luminance component using the luminance computation sub-block. The luminance component enters the approximate Gaussian pyramid and log average sub-blocks. At the same time, the HDR RGB triplet is buffered in the buffer sub-block. Finally, the local and global estimate of illumination, luminance component, and buffered RGB triplet are fed simultaneously to the color tone mapping sub-block to get the mapped RGB triplet. Approximate Gaussian pyramid and log average sub-blocks are explained above. Luminance calculation, buffer and color tone mapping sub-blocks are discussed in detail in this section.

The luminance calculation sub-block calculates the luminance component of a pixel in fixed-point mathematics as:

$$L = 0.27 \times R + 0.67 \times G + 0.06 \times B$$

While the luminance component is processed by the approximate Gaussian pyramid to estimate the local illumination, the RGB triplet is buffered in the buffer sub-block. As shown in table 4, the latency between frames of the Gaussian pyramid is 32 rows of the input image. Hence, for 1024×768 images three external memories, each of size 32×1024×32 bits are needed.

Each buffered RGB triplet is fed to the color tone mapping sub-block simultaneously with its luminance component (L), global illumination estimate ($L_{ave}$) and local illumination estimate (ave). Tone mapped color components are computed using the following equations:

$$\log_2(R_{map}) = \log_2(R+2752) - \log_2(L+2621) + \log_2(L) - \log_2(\text{ave} + a^*L_{ave})$$

$$\log_2(G_{map}) = \log_2(G+2542) - \log_2(L+2621) + \log_2(L) - \log_2(\text{ave} + a^*L_{ave})$$

$$\log_2(B_{map}) = \log_2(B+3328) - \log_2(L+2621) + \log_2(L) - \log_2(\text{ave} + a^*L_{ave})$$

Finally, the method of the present invention calculates the inverse base 2 logarithm to get the mapped RGB triplet. The base 2 logarithm and its inverse are computed using the same approach discussed herein.

Figure 8:
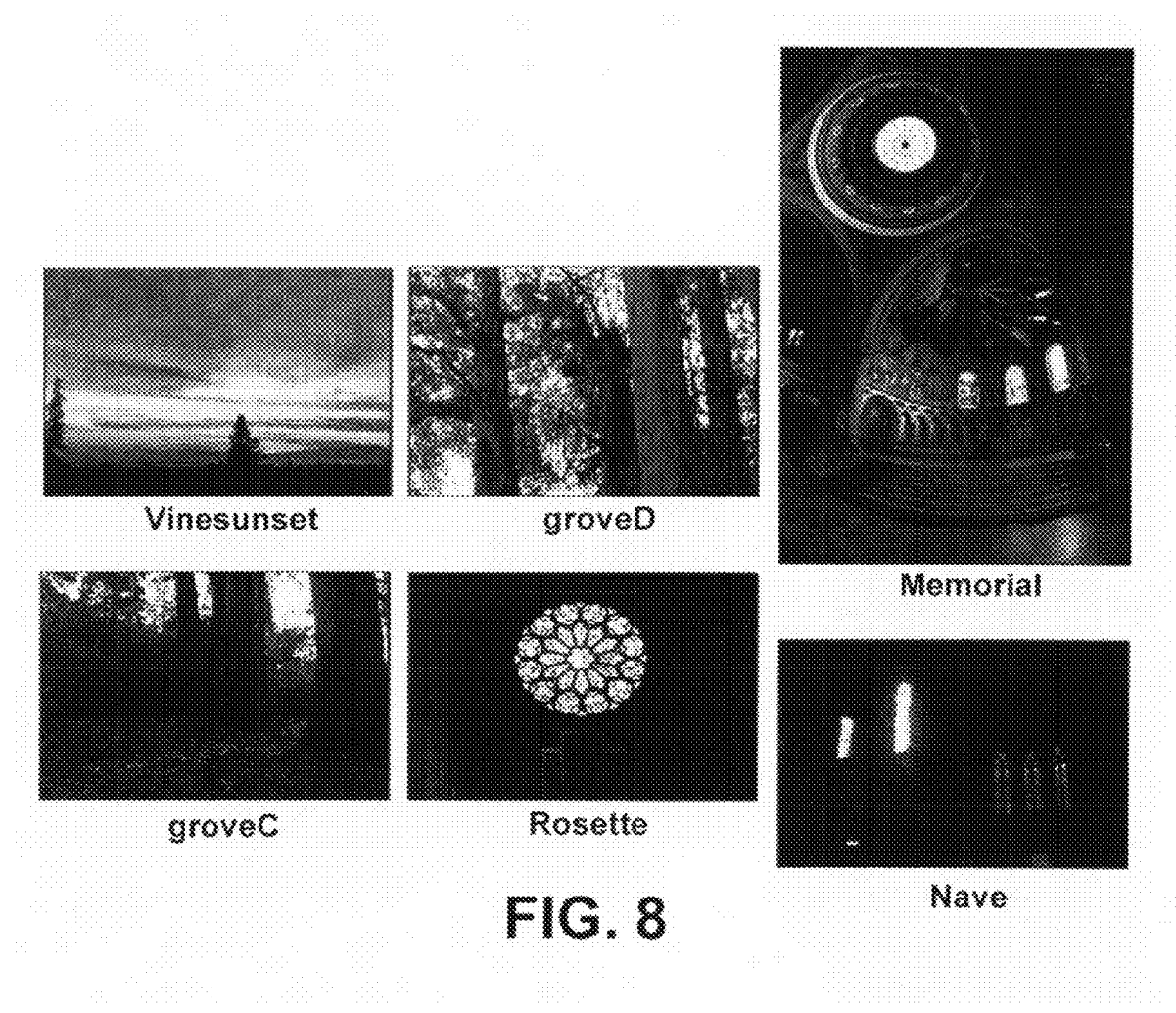
FIG. 8 is a set of image used for a simulation in connection with the method of the present invention as disclosed in FIG. 7.
Figure 9:
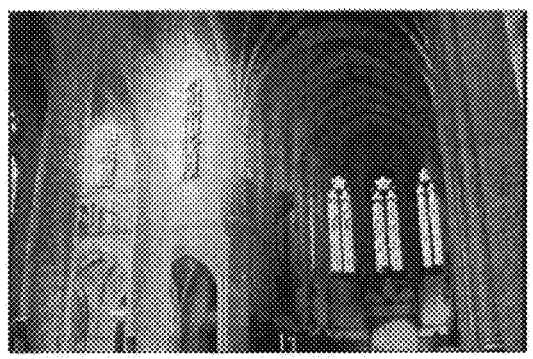
FIG. 9 is the set of images of FIG. 8 after being subjected to a method in accordance with one embodiment of the present invention.
Figure 9:
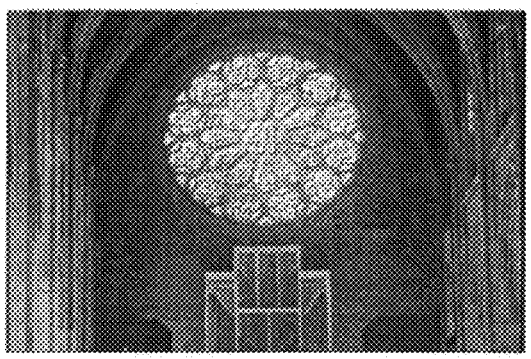
Figure 9:
Figure 9:
Figure 9:
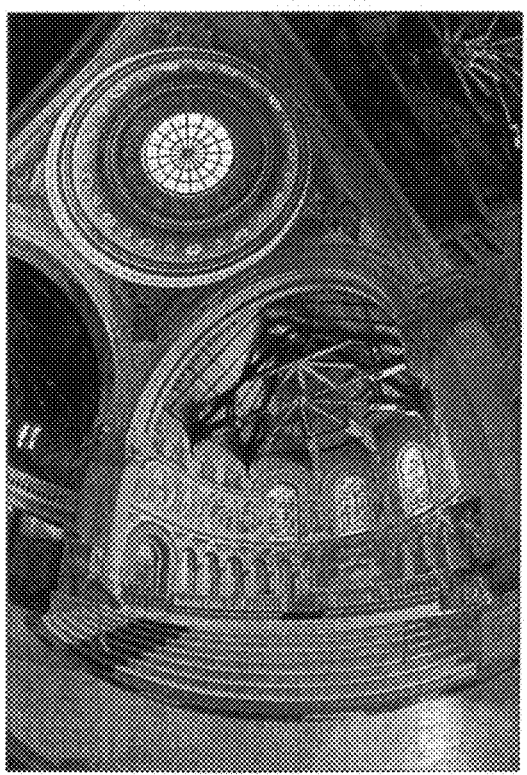
Figure 9:

The extended algorithm is again described in VHDL, and synthesized for a StratixII FPGA device using Altera's Quartus II v5.0 toolset; the architecture is sized in order to accommodate 3×32 bit colored HDR input image of 1024× 768 pixels. Table 4 summarizes the synthesize report from Quartus. Comparing the results to Table 2, one notices a larger utilization of internal memory due to the increase in the dynamic range of the input images. The operating frequency is less due to additional complexity of the extended architecture. Finally, the hardware latency of the architecture is increased because of the new sub-blocks. The functionality of the extended algorithm of the present invention's method is again verified by simulating the processing of test images using Modelsim. FIG. 8 illustrates the colored version of the set of images from the Debevec library. FIG. 9 illustrates the set of images after being processed by the method of the present invention wherein the method utilizes an extended algorithm.

TABLE 4

Summary of Hardware Synthesis Report for the Extended Algorithm

| Device | EP2S130F780C4 |
|---|---|
| Total bits of memory | 3,586,304/6,747,840 (53%) |
| Total logic cells | 44,572/106,032 (42%) |
| Max operating frequency | 65.86 MHz |
| Latency between rows | 3 (controller) + 32 (filter_size/2) + 36 (hardware) |
| Latency between frames | 32 rows (filter_size/2) |

Advantages of the Present Invention:

While not wishing to be bound to any one theory and/or advantage, the present invention possesses the following advantages over previously known real-time local tone mapper methods.

Figure 10:
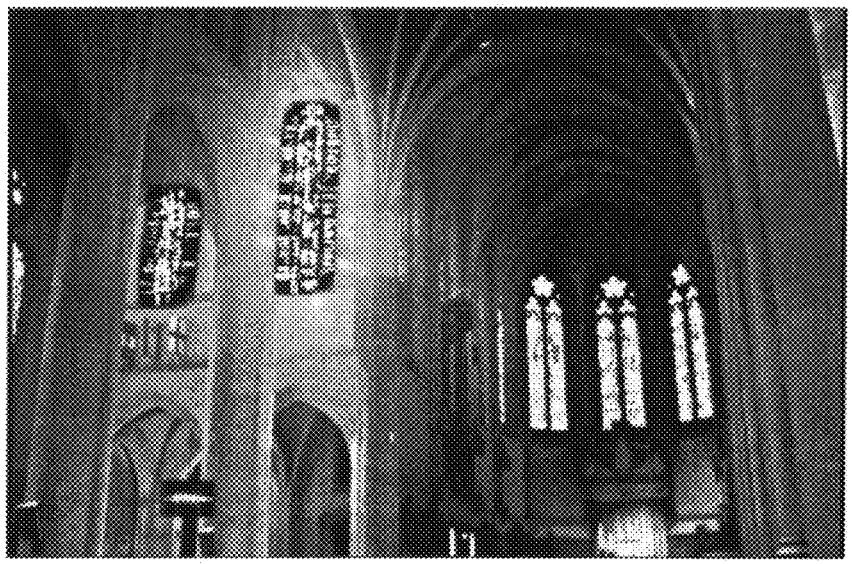
FIG. 10 is an image that has be subject to processing with a prior art method.

A multi gain image processing algorithm was previously developed by Lockheed Martin and is disclosed in U.S. Pat. No. 6,501,504. The algorithm disclosed therein contains a method to generate high dynamic range images by combining data from a low gain and a high gain lens and a local tone mapping operator. This algorithm was also implemented in FPGA and has achieved a frame rate of 30 frames per second. However, the local tone mapping operator disclosed therein fails to achieve the elimination of the halo artifacts. FIG. 10 shows the nave image after processing by the method disclosed in U.S. Pat. No. 6,501,504. Black bands can be easily noticed around the church window and lamp.

The authors in "Interactive Time-Dependent Tone Mapping using Programmable Graphics Hardware," *ACM International Conference Proceeding Series: 14th Eurographics Workshop on Rendering*, Vol. 44, pp. 26 through 37, 2003 mapped the Reinhard operator to the pixel processor on a programmable graphics hardware board. They were able to process 256×256 gray scale images at their target frame rate of 30 frames per second, but not larger resolution images such as 512×512 images. Another real-time implementation of the Reinhard operator that includes perceptual effects was suggested in "Perceptual Effects in Real-Time Tone Mapping," *Proceedings of the 21st Spring Conference on Computer Graphics*, pp. 195 through 202, 2005. The performance of the implementation was measured on a Pentium 4 2 GHz processor and NVIDIA GeForce 6800GT graphics card. Using four scales of Gaussian pyramid, they were able to process only 14 frames per second for a 1024×768 image. On the other hand, graphics cards are not considered as embedded platform. One advantage of the method of the present invention is that it can be easily embedded inside cameras or displays using FPGAs or other embedded platforms.

Although the invention has been shown and described with respect to certain embodiments, it is obvious that equivalent alterations and modifications will occur to others skilled in the art upon the reading and understanding of this specification. In particular with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A method for achieving the local tone mapping of high dynamic range images comprising the steps of:
   (A) providing at least one HDR RGB triplet suitable for local tone mapping;
   (B) calculating at least one luminance component of the at least one HDR RGB triplet using a luminance computation sub-block;
   (C) supplying the at least one luminance component to at least one approximated Gaussian pyramid sub-block and at least one log average sub-block, wherein the luminance components supplied to the at least one approximated Gaussian pyramid sub-block and at least one log average sub-block are used to, respectively, generate at least one local illumination estimate and at least one global illumination estimate, wherein the approximated Gaussian pyramid uses a number of different two-dimensional square windows to calculate a number of different averages around a pixel in order to select the most suitable local illumination estimate, wherein the two-dimensional square windows are implemented by utilizing a vertical one-dimensional filter calculating the averages along columns and a horizontal one-dimensional filter calculating the averages along rows, wherein the vertical filter is implemented by utilizing a first accumulator devoted to a falling geometric series and a second accumulator devoted to a rising geometric series;
   (D) buffering the HDR RGB triplet in at least one buffer sub-block;
   (E) supplying the at least one local illumination estimate, the at least one global illumination estimate, the at least one luminance component and the buffered RGB triplet to a color tone mapping sub-block to generate a mapped RGB triplet; and
   wherein steps (B), (C) and (D) are carried out simultaneously.

2. The method of claim 1, wherein the method is carried out in an embedded system selected from general purpose digital signal processors, field programmable gate arrays (FPGAs), or application specific integrated circuits.

3. The method of claim 2, wherein the method is carried out in a field programmable gate arrays (FPGAs).

4. The method of claim 1, wherein the method is carried out in the processing portion of a digital camera.

5. The method of claim 1, wherein the method is carried out in an embedded system selected from general purpose digital signal processors, field programmable gate arrays (FPGAs), or application specific integrated circuits.

6. The method of claim 5, wherein the method is carried out in a field programmable gate arrays (FPGAs).

7. The method of claim 1, wherein the method is carried out in the processing portion of a digital camera.

8. The method of claim 1, wherein the tone mapping occurs in real time.

* * * * *